US012703127B2

(12) United States Patent
Moyes et al.

(10) Patent No.: US 12,703,127 B2
(45) Date of Patent: Aug. 11, 2026

(54) METHOD AND APPARATUS FOR UNIFORM UV CURING OF RESIN PARTS HAVING IRREGULAR SURFACES

(71) Applicant: The Boeing Company, Arlington, VA (US)

(72) Inventors: Eric Eugene Moyes, Desoto, MO (US); Marcos Pantoja, St. Louis, MO (US); Michelle Ruiz, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 154 days.

(21) Appl. No.: 18/349,442

(22) Filed: Jul. 10, 2023

(65) Prior Publication Data

US 2025/0018615 A1 Jan. 16, 2025

(51) Int. Cl.

*B29C 35/08* (2006.01)
*B29C 35/02* (2006.01)
*B29C 65/16* (2006.01)

(52) U.S. Cl.

CPC ...... *B29C 35/0805* (2013.01); *B29C 35/0288* (2013.01); *B29C 65/1664* (2013.01); *B29C 2035/0827* (2013.01)

(58) Field of Classification Search

CPC ........ B29C 2035/0827; B29C 35/0805; B29C 2045/0075; B29C 33/06; B29C 64/129; B29C 64/135; B29C 64/264; B29C 64/268; B29C 64/273; B29C 64/277; B29C 64/282; B29C 64/286; B29C 64/291; B29C 71/04; B29C 35/0288; B29C 65/1664

See application file for complete search history.

(56) References Cited

U.S. PATENT DOCUMENTS

2014/0191445 A1* 7/2014 Rist .................... B29C 35/0888 264/496
2017/0240714 A1* 8/2017 Ahmed .................... C08J 5/249
2021/0003867 A1* 1/2021 Takenaka ......... B29D 11/00653

FOREIGN PATENT DOCUMENTS

CN 102909164 A * 2/2013
GB 2483470 A * 3/2012 ......... B29C 35/0805

OTHER PUBLICATIONS

Translation CN-102909164-A, Feb. 2013, Gong. (Year: 2013).*
Jacobsen, "A Bright Future for Light-Cured Composite Materials," RadTech 2018, Chicago, Illinois, 12 pages.https://radtech.org/proceedings/2018/Formulation/Jacobsen-Alan_A-Bright-Future-for-Light-Cured-Composite-Materials.pdf.
Kazi et al., "A literature survey for electronically dimmable windows: A Perspective of Industry 4.0," International Journal of Advanced Research in Science, Engineering and Technology (IJARSET), vol. 7, Issue 2 , Feb. 2020, 7 pages.
Wikipedia, "Smart glass," Wikimedia Foundation, Inc., last edited on Jun. 20, 2023, accessed Jul. 7, 2023, 9 pages. https://en.wikipedia.org/w/index.php?title=Smart_glass&oldid=1161036638.

* cited by examiner

*Primary Examiner* — Philip C Tucker
*Assistant Examiner* — Jimmy R Smith, Jr.
(74) *Attorney, Agent, or Firm* — Yee & Associates, P.C.

(57) ABSTRACT

Photopolymer resin parts having irregular surfaces are evenly cured using a UV lamp configured to radiate the irregular surfaces with UV light with uniform intensity.

20 Claims, 22 Drawing Sheets

METHOD AND APPARATUS FOR UNIFORM UV CURING OF RESIN PARTS HAVING IRREGULAR SURFACES

BACKGROUND INFORMATION

1. Field

The present disclosure broadly relates to radiation of objects using UV light, and deals more particularly with a method and apparatus for uniform curing of polymer resin parts having irregular surfaces using UV radiation.

2. Background

Thermosetting polymer resins containing photo-initiators, commonly referred to as photopolymers, can be cured using lamps that emit ultraviolet (UV) light ("UV cured"). Irradiation of the polymer resins with UV light triggers a chemical reaction that causes crosslinking and hardening of the resin. Reinforced photopolymers can also be UV cured, providing that a reinforcement such as glass, is used that is transparent to UV light. In the aerospace industry, photopolymers are sometimes used to produce adhesives, shims and other parts.

In some applications, the parts may have irregular surfaces such as contours on which the UV curing light is incident. Due to these surface irregularities, the distance between the source of the UV light and the surface of the part may vary. As is well known, the intensity of light decreases with increasing distance between the source of the light and the surface on which it is incident. Consequently, the intensity of the UV light incident on a part having surface irregularities may vary over areas of the part. These variations in UV light intensity can result under curing and/or over curing of different areas of the part. Uneven curing of the part in this manner can have undesired effects on the mechanical properties and performance of the part.

Accordingly, it would be desirable to provide a method and apparatus for irradiating a photopolymer resin part having irregular surfaces with UV light that achieves uniform curing of the part.

SUMMARY

The disclosure relates in general to curing polymer resin parts, and more specifically to a method and apparatus for evenly curing photopolymer resin parts having irregular shapes or surfaces. The disclosed method involves irradiating the part with UV light such that the intensity of the UV light incident on the part is constant in intensity over all surfaces of the part, despite surface irregularities such as curves, contours, angles or jogs, etc.

According to one aspect, a method is provided of curing a part formed of a photopolymer resin and having an irregular surface. The method comprises irradiating the part uniformly throughout the irregular surface using UV light.

According to another aspect, a method is provided of uniformly curing a photopolymer resin part having an irregular surface using UV light. The method comprises irradiating the part with UV light, including maintaining intensity of the UV light incident on the irregular surface at a substantially constant value over the irregular surface.

According to still another aspect, apparatus is provided for curing a photopolymer resin part having an irregular surface using UV light. The apparatus comprises a plurality of UV light sources each configured to radiate UV light. The UV light sources are arranged in a pattern that irradiates the irregular surface with UV light with uniform intensity.

One of the advantages of the disclosed method and apparatus is that a photopolymer resin part having an irregular surface or shape can be uniformly cured over its entire area. A related advantage is that undesired effects on mechanical properties of the part caused by under curing or over curing can be avoided.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
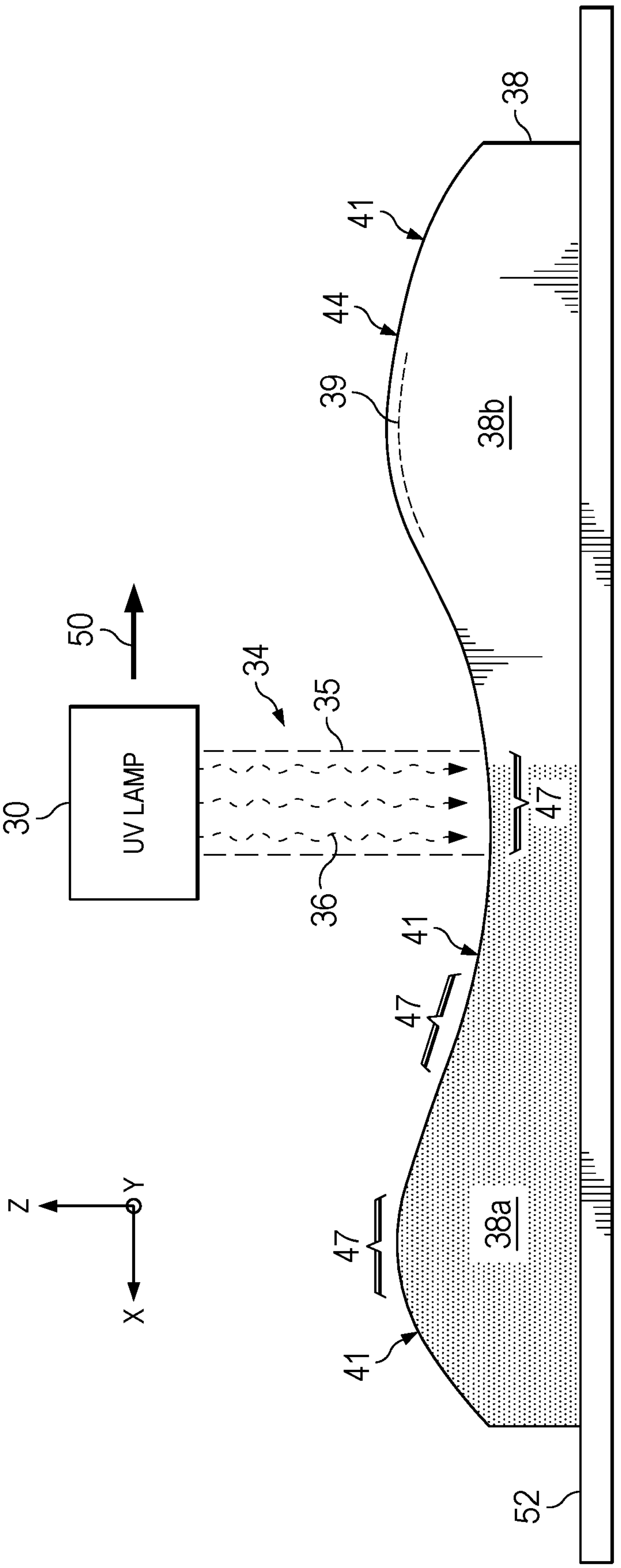
FIG. 1 is an illustration of a diagrammatic side view showing a photopolymer resin part having an irregular surface being irradiated with UV light and having been partially cured.

Referring first to FIG. 1, a part 38 supported on a base 52 is formed of a thermosetting photopolymer resin and may contain a reinforcement such as glass fibers shown). The photopolymer resin contains a (not photoinitiator which, when exposed to UV light (radiation) of a desired wavelength and intensity, results in crosslinking and hardening of the resin. The term "part" is used in its broadest sense, and includes a single piece or object, multiple pieces or segments, and a section, layer or coating 39 on an underlying part or substrate. The part 38 has a surface 44 that includes one or more irregularities 41, and therefore will be referred to hereinafter as an irregular surface 44. As used herein, the terms "irregular", "irregularities" and "irregular surface" include, for example and without limitation, changes in features or shapes of the surface of a part 38, such as curves, contours, jogs, angles, steps, uneveness, surface interruptions, or other surface geometries, other than those that are than flat. For example, the irregular surface (44) may have complex contours, and/or a coating having varying depths.

The part 38 is cured using one or more sources of UV light 36, which for ease of description will be collectively referred to as a UV lamp 30. As will become later apparent, the multiple sources of UV light 36 may without limitation, UV LEDS emitting comprise, (light diodes) 32. The particular wavelength of the UV light 36 used will depend upon the application, including type of resin and photoinitiator being used, but generally will be radiation within wavelengths between approximately 100 and 400 nm (nanometers). The UV lamp 30 irradiates 34 the part 38 with UV light 36 within a window 35 determined by the geometry of the aperture(s) of the UV light sources used in the UV lamp 30.

In order to cure the part 38, the UV lamp 30 is moved 50 over the irregular surface 44 at a rate that effects even, complete curing of the part 38. However, in some examples, the UV lamp 30 may be stationary, and the part 38 may be moved relative to the UV lamp 30. As shown in the Figure, a portion 38*a* of the part 38 has been cured, while another portion 38*b* remains uncured as a UV lamp 30 is moved from left to right in FIG. 1. As will be explained below in more detail, the part 38 is irradiated 34 with UV light 36 such that the intensity of the UV light incident on the part 38 is substantially constant (the same value) over all sections of the irregular surface 44 of the part 38. As a result of maintaining the intensity of UV light constant over the entire irregular surface 44 despite the presence of irregularities 41, the part 38 is evenly cured. Maintaining constant intensity of the incident UV light 36 can be achieved by employing various embodiments of the disclosed methods and apparatus. For example, in the example shown in FIG. 1, the UV lamp 30 can be moved and/or rotated along any of the X, Y, axes in a manner that maintains a constant desired distance between the UV lamp 30 and individual sections 47 of the part 38.

Figure 2:
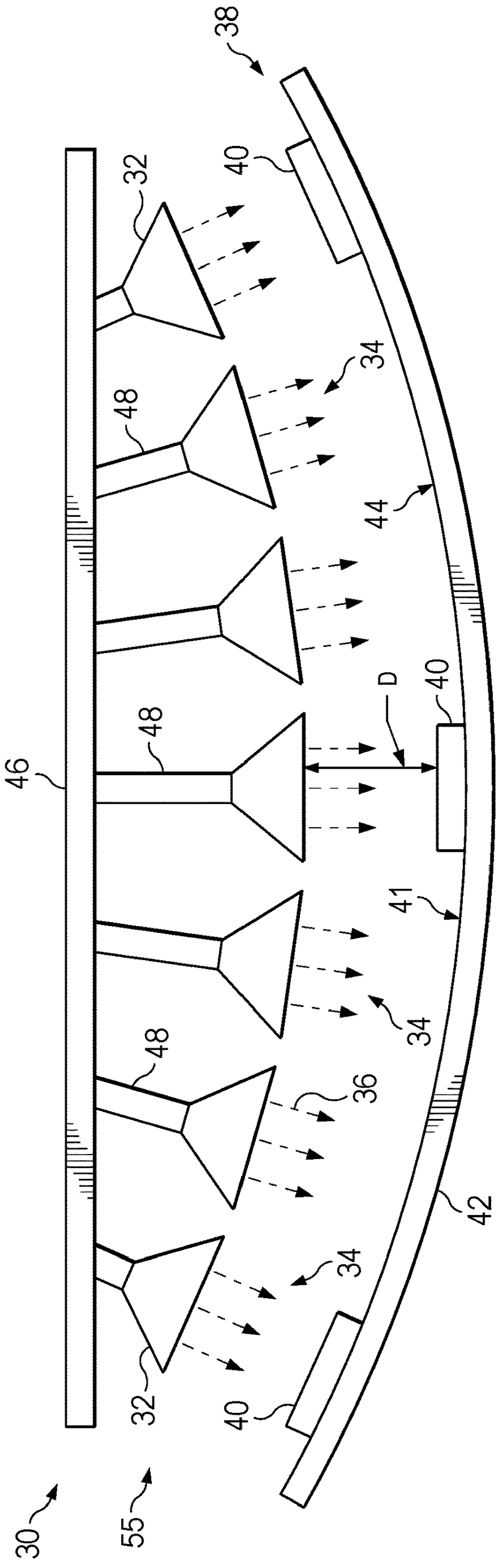
FIG. 2 is an illustration of a diagrammatic side view of one embodiment of apparatus for uniformly irradiating a photopolymer part on a curved substrate.

Attention is now directed to FIG. 2 which illustrates one embodiment of an apparatus for UV curing a part 38 having one or more irregularities 41. In this example, the part 38 comprises multiple strips 40 of a photopolymer resin that are spaced apart from each other and supported by a curved substrate 42. The strips 40 may comprise individual parts, or may form parts of a larger part such as that shown in FIGS. 20A-20D. In this example, although the strips 40 themselves are not irregular, the surface on which they are supported is irregular, specifically, curved. A UV lamp 30 comprises a plurality of individual UV light sources in the form of UV LEDs 32, some of which are mounted on fixed supports 48 that are attached to a rigid frame 46. The UV LEDs 32 are arranged in an arc 49 that complementally matches the curvature of the curved substrate 42 on which the strips 40 are mounted. Arranging the UV LEDs 32 in this mounting configuration results in the UV LEDS 32 being spaced constant, uniform distances D from the irregular surface 44 of the curved substrate 42, and thus also a uniform distance from each of the strips 40. As a result of the uniform spacing between the UV LEDs 32 and the strips 40, the intensity of the UV light 36 incident on the resin strips 42 has the same value, in other words, the strips 40 are irradiated with UV light 36 uniformly and therefore receive the same amount of UV radiation. Consequently, because the strips 40 are irradiated uniformly with the same level of UV light intensity, they are evenly cured.

Figure 3:
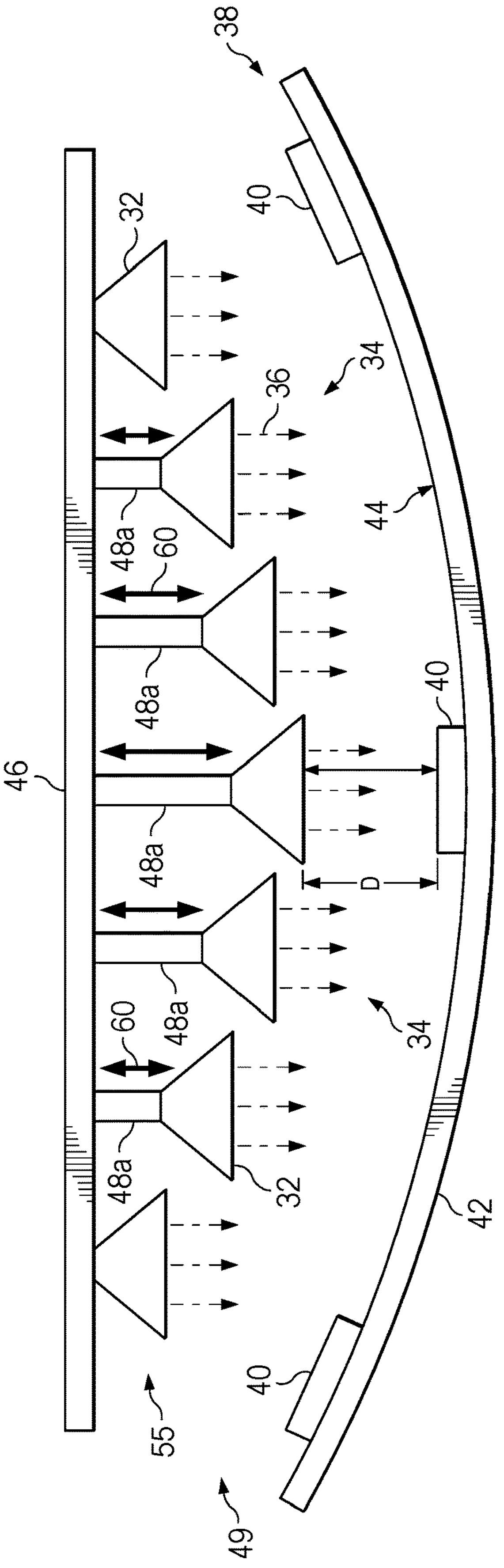
FIG. 3 is an illustration similar to FIG. 2 showing another embodiment of the apparatus.

FIG. 3 illustrates another embodiment of an apparatus for uniformly irradiating a photopolymer resin part 38 similar to that shown in FIG. 2. In this embodiment, however, the UV LEDs 32 are mounted on supports 48*a* that can shift 60 linearly, toward and away from the substrate 42, thereby allowing the distance D between the UV LEDs 32 and the substrate 42 (and thus the strips 40) to be adjusted as needed in order to irradiate the strips 40 with UV light of uniform intensity. Depending upon the application, the linear position of the UV LEDs 32 may be adjusted manually, or automatically using air or pneumatic cylinders (FIG. 6-9), or linear motors. Adjustability of the distance D between the UV LEDs 32 the part 38 (strips 40) allows the UV lamp 30 to be reconfigured into a pattern 55 complementally matching the geometry of the irregular surface 44 (FIG. 1) of the part 38. After adjustment, similar to the embodiment shown in FIG. 2, all of the UV LEDs 32 are spaced the same desired distance D from the part 38, even though some surfaces of the part 38 are irregular, consequently the part 38 can be evenly cured.

Figure 4:
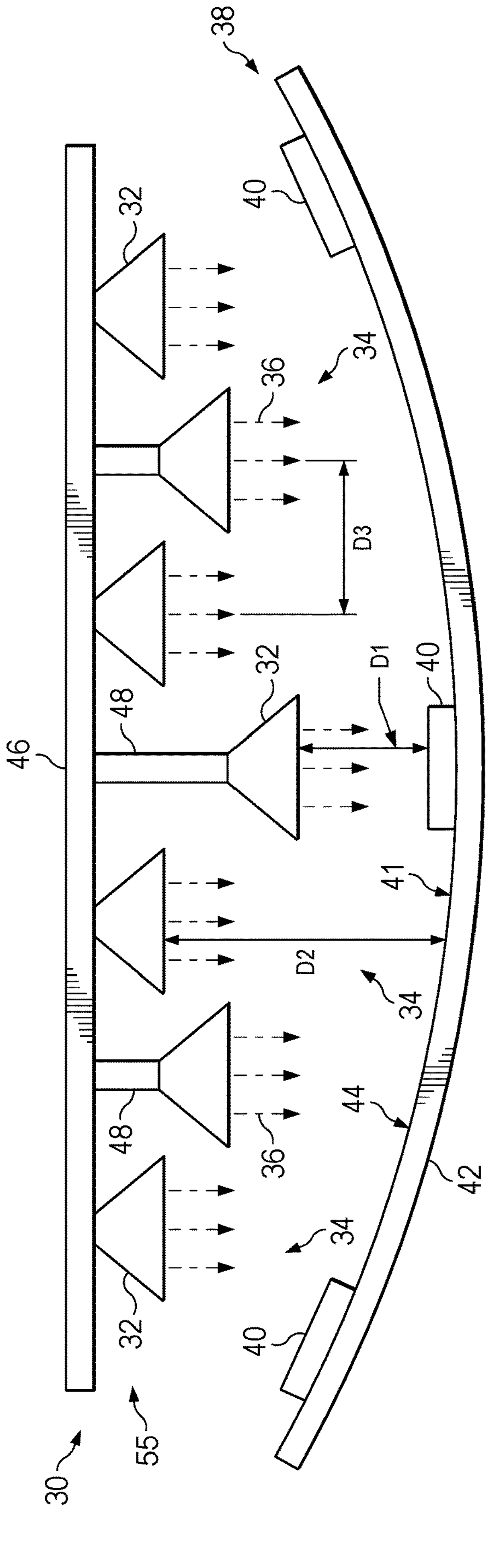
FIG. 4 is an illustration similar to FIG. 2 showing a further embodiment of the apparatus.

Attention is now directed to FIG. 4 which illustrates a further embodiment of apparatus for uniformly curing a photopolymer resin part 38, again similar to that shown in FIGS. 2 and 3, in which the part 38 may comprise different portions or sections that lie on a substrate 42 which itself is irregular, in this case, one that is curved. In this example, the UV LEDs 32 are supported from a frame 46 by fixed supports 48. However, rather than being uniformly spaced from the part 38, they may be spaced at different distances D1, D2 away from the irregular surface 44 of the part 38 while also being spaced at different distances D3 from each other. The distances D1, D2, D3 are selected such that the UV LEDs 32 are arranged in a pattern (55) that results in the intensity of the UV light 36 incident on the part 38 (strips 40) being uniform, resulting in even curing of the part 38.

The UV LEDs 32 forming the UV lamp 30 may take any of a variety of forms and configurations. For example, referring to FIG. 5, a UV lamp 30 may comprise a plurality of UV LEDs 32 arranged in an N×M array 51 on a plate 53 provided with a fitting 72 that can be coupled with the supports 48 shown in FIGS. 2-4.

Figure 6:
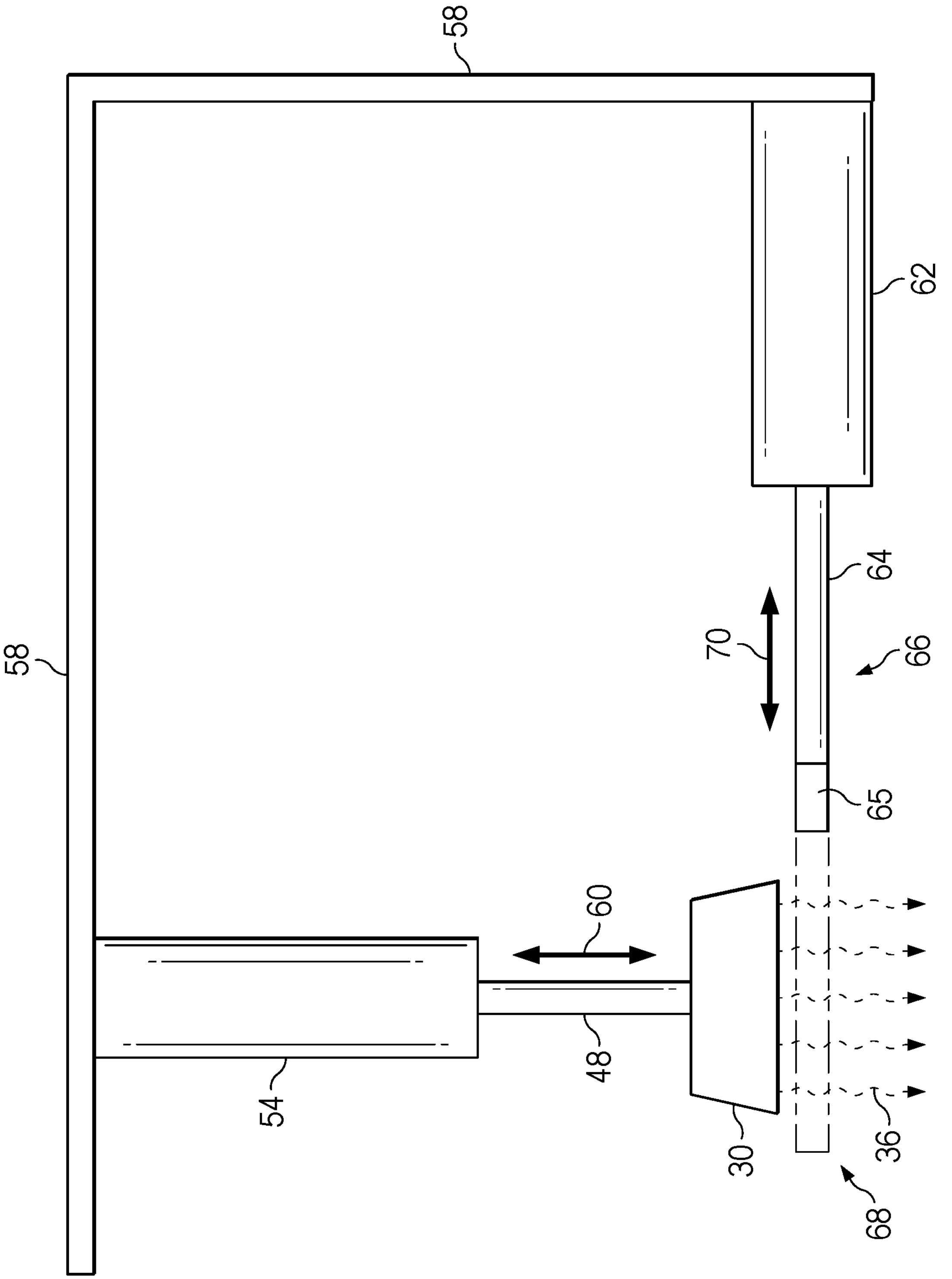
FIG. 6 is an illustration of a side view of an adjustable UV lamp, also showing a mechanically operated filter for selectively blocking UV light radiating from the UV lamp.

Referring to FIG. 6, in some applications, depending upon the number and spatial orientation of the UV LEDS 32, it may be desirable to block the UV light emanating from one or more of the UV LEDs 32 in order to achieve irradiation 34 of the part 38 over its entire irregular surface 44 with uniform intensity. As shown in the Figure, complete blocking of the UV light 36 can be achieved using a filter 64 in the form of a shutter 65 that is opaque and is interposed between one or more of the UV LEDs 32 and the part 38. The shutter 65 is controlled by an actuator 62 that shifts 70 the shutter 65 between an open position 66 allowing the UV light 36 to irradiate 34 the part 38, and a closed position 68 (indicated by broken lines in FIG. 6) that blocks i.e., prevents UV light 36 from reaching the part 38. Also shown in FIG. 6 is an automatically controlled actuator 62 that can shift 60 the linear position of support 48, which in turns controls the distance between the UV lamp 30 and the irregular surface 44 of the part 38. A variety of other types of automated shutters 65 are possible.

Figure 5:
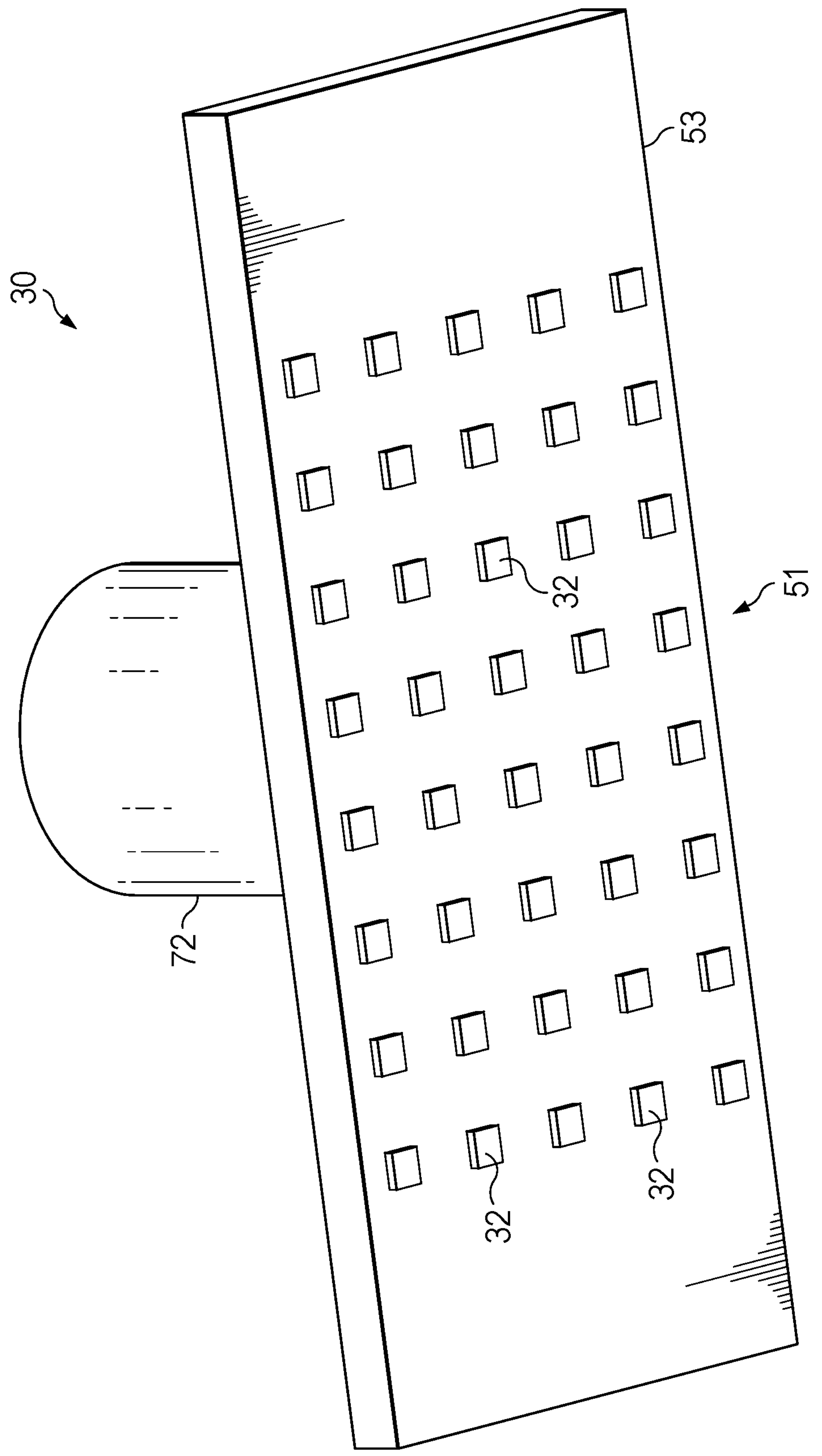
FIG. 5 is an illustration of a perspective view of a UV lamp having a two dimensional array of UV LEDS.
Figure 7:
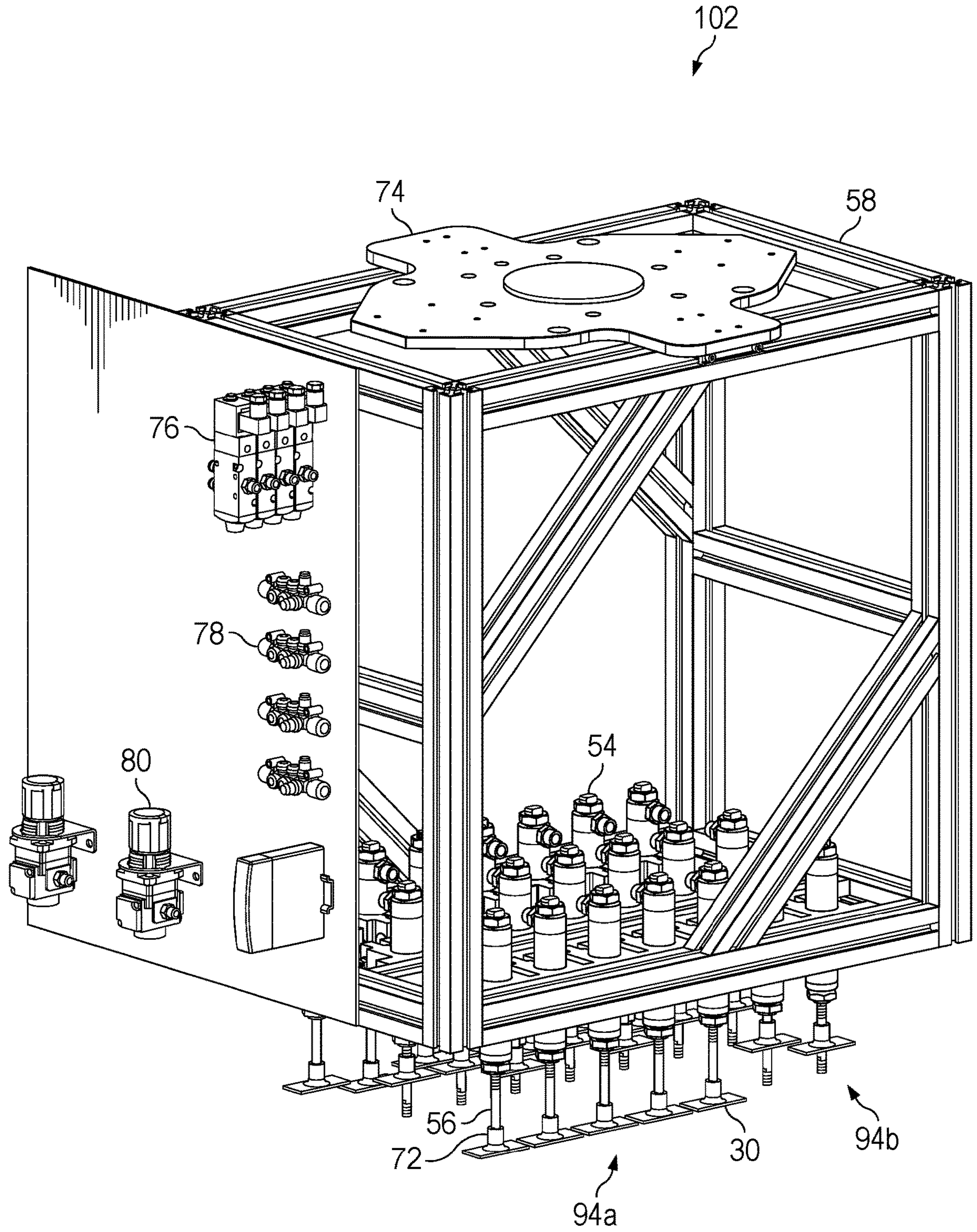
FIG. 7 is an illustration of a perspective view of one side of an end effector for curing photopolymer parts using an array of adjustable UV LEDS.
Figure 8:
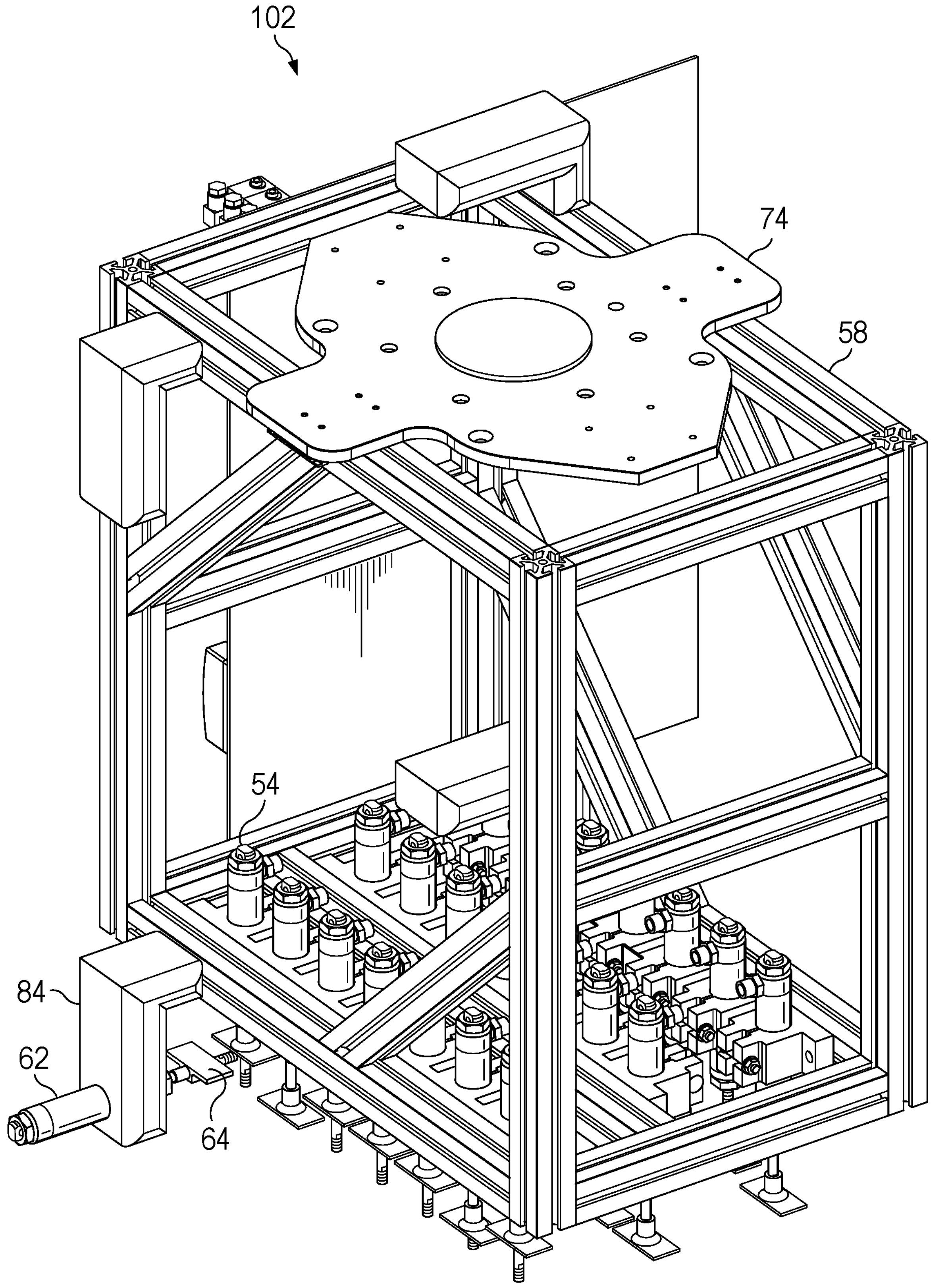
FIG. 8 is an illustration of a perspective view of another side of the end effector shown in FIG. 7.
Figure 9:
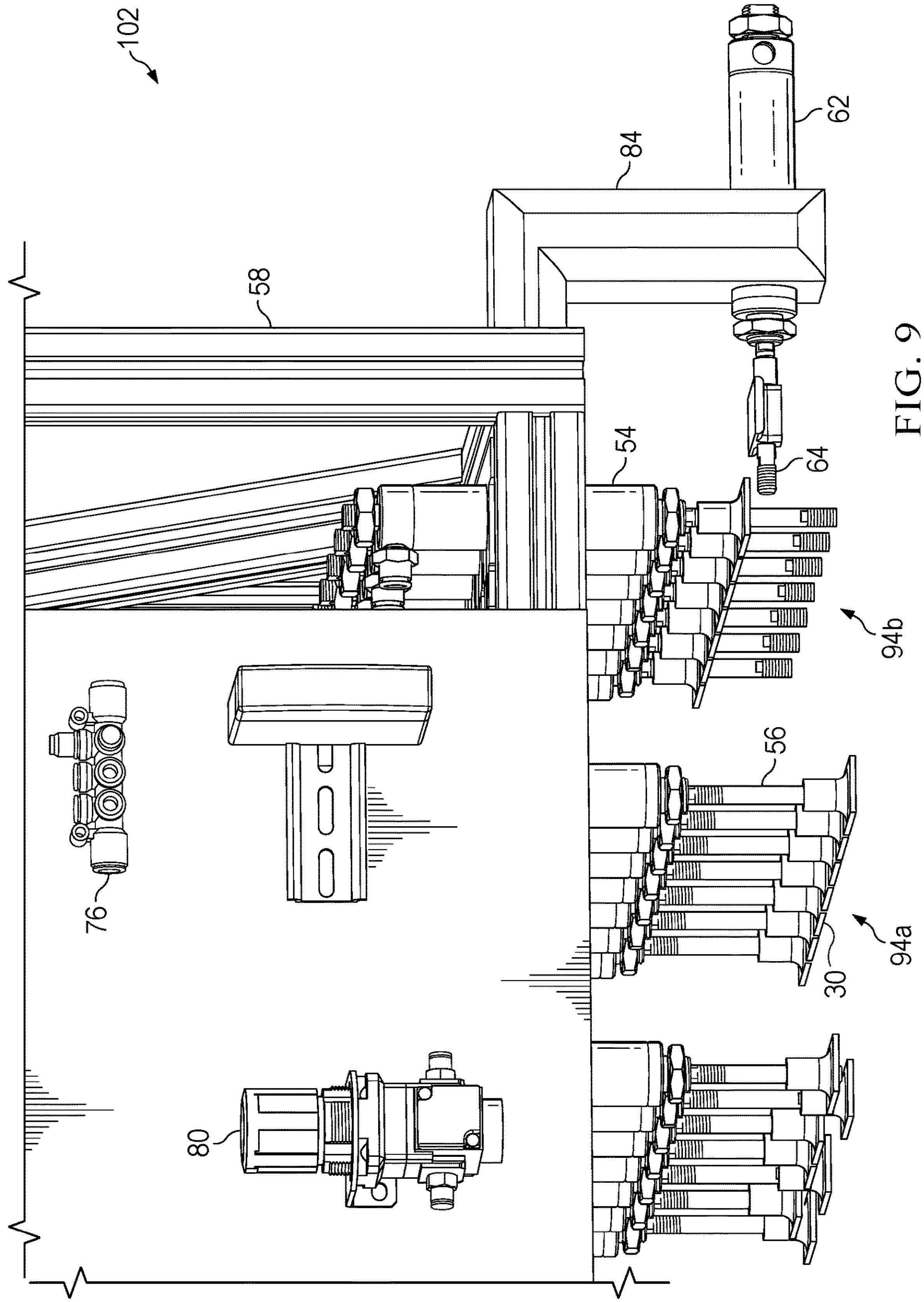
FIG. 9 is illustration an of enlarged, perspective view of the end effector of FIGS. 7 and 8, better showing the position of a filter for blocking UV light.

Attention is now directed to FIGS. 7-9 which depict details of one embodiment of an end effector 102 that may be mounted on a manipulator such as a robot 118 (FIG. 20) to perform UV light curing of photopolymer resin parts 38. A plurality of UV lamps 30 of the type shown in FIG. 5 are respectively mounted on fittings 56 which connect the UV lamps 30 to air cylinder assemblies 54 which are arranged in a two dimensional N×M array and are mounted on a generally cubical, rigid frame 58. The frame 58 is provided with a mount 74 which adapts the end effector 102 to be mounted on the robot 118. Each of the air cylinder assemblies 54 controls the displacement position of a corresponding UV lamp 30, and therefore the distance that the UV lamp 30 is spaced from the irregular surface 44 of the part 38. As explained earlier, the intensity of the UV light 36 incident on the irregular surface 44 is determined by this spacing since the intensity of transmitted UV light 36 is inversely related to the square of the distance between the source of the UV light 36 (UV lamp 30) and the irregular surface (irregular surface 44) upon which it is incident. The air cylinder assemblies 54 can independently adjust the linear position of the UV lamps 30. In FIGS. 7 and 9, some of the air cylinder assemblies 54 have been extended to a fully extended position 94*a*, while other of the air cylinder assemblies 54 are in a fully retracted position 94*b*. The end effector 102 may also carry various items required to control operation of the air cylinder assemblies 54 and actuators 62 (FIGS. 6 and 7), such as air solenoids 76, air manifolds 78 and air pressure regulators 80.

Figure 10:
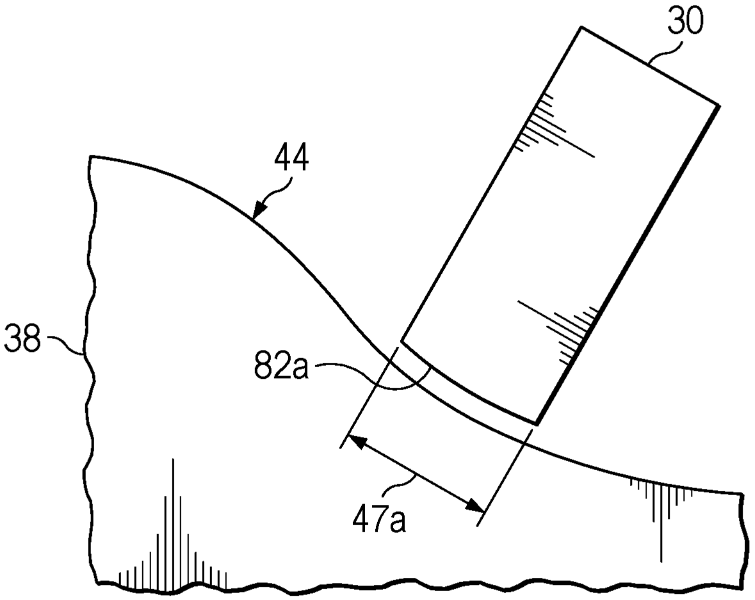
FIG. 10 is an illustration of a diagrammatic view of a UV lamp having a curved emitting face that matches the geometry of an irregular surface of a part.
Figure 11:
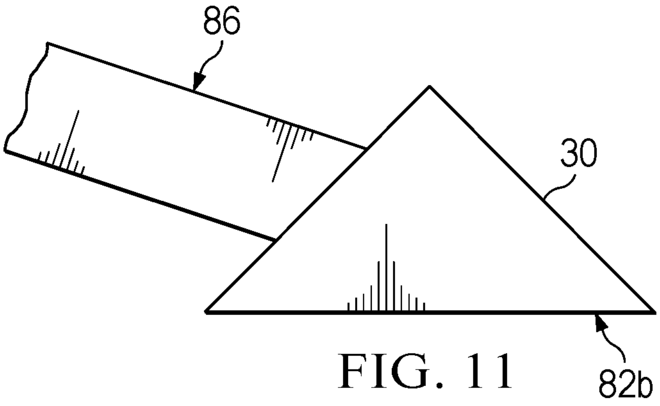
FIGS. 11-14 are illustrations of diagrammatic views of additional embodiments of UV lamps having emitting faces of various shapes.
Figure 12:
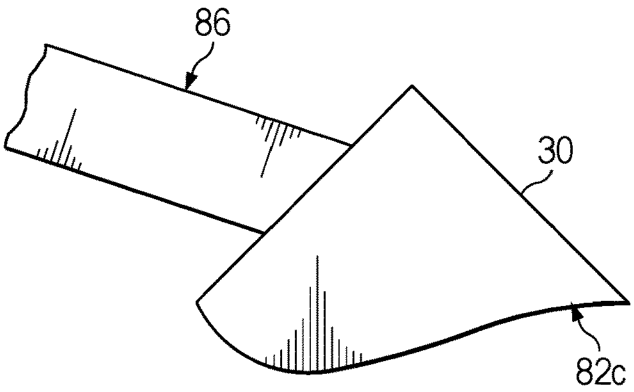
Figure 13:
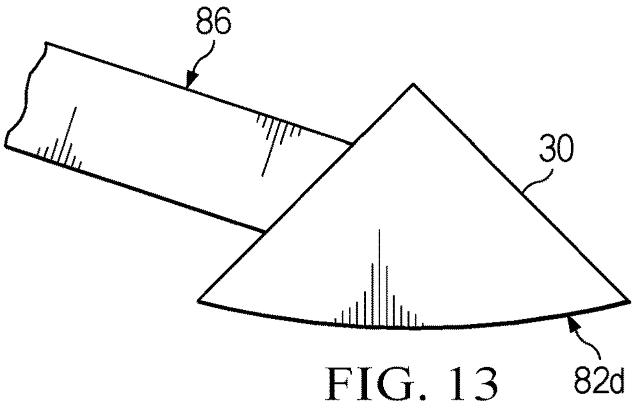
Figure 14:
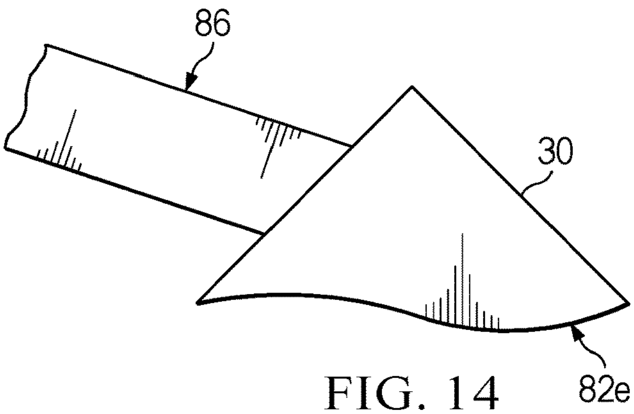

Attention is now directed to FIG. 10, which illustrates how the UV lamps 30 can be tailored in their geometry to match the geometry of irregularities 41 in the irregular surface 44 of a part 38. In the example shown in FIG. 10, UV light sources such as UV LEDs 32 are arranged to form a curved outer face 82*a* of a UV lamp 30 that matches the curvature of one or more sections 47*a* of the irregular surface 44 of a part 38. FIG. 11-14 illustrate other possible geometries of UV lamp faces 82*b*-82*e*. In each of these examples, the UV lamp 30 is shown as an end effector mounted on a manipulator 86.

Figure 15:
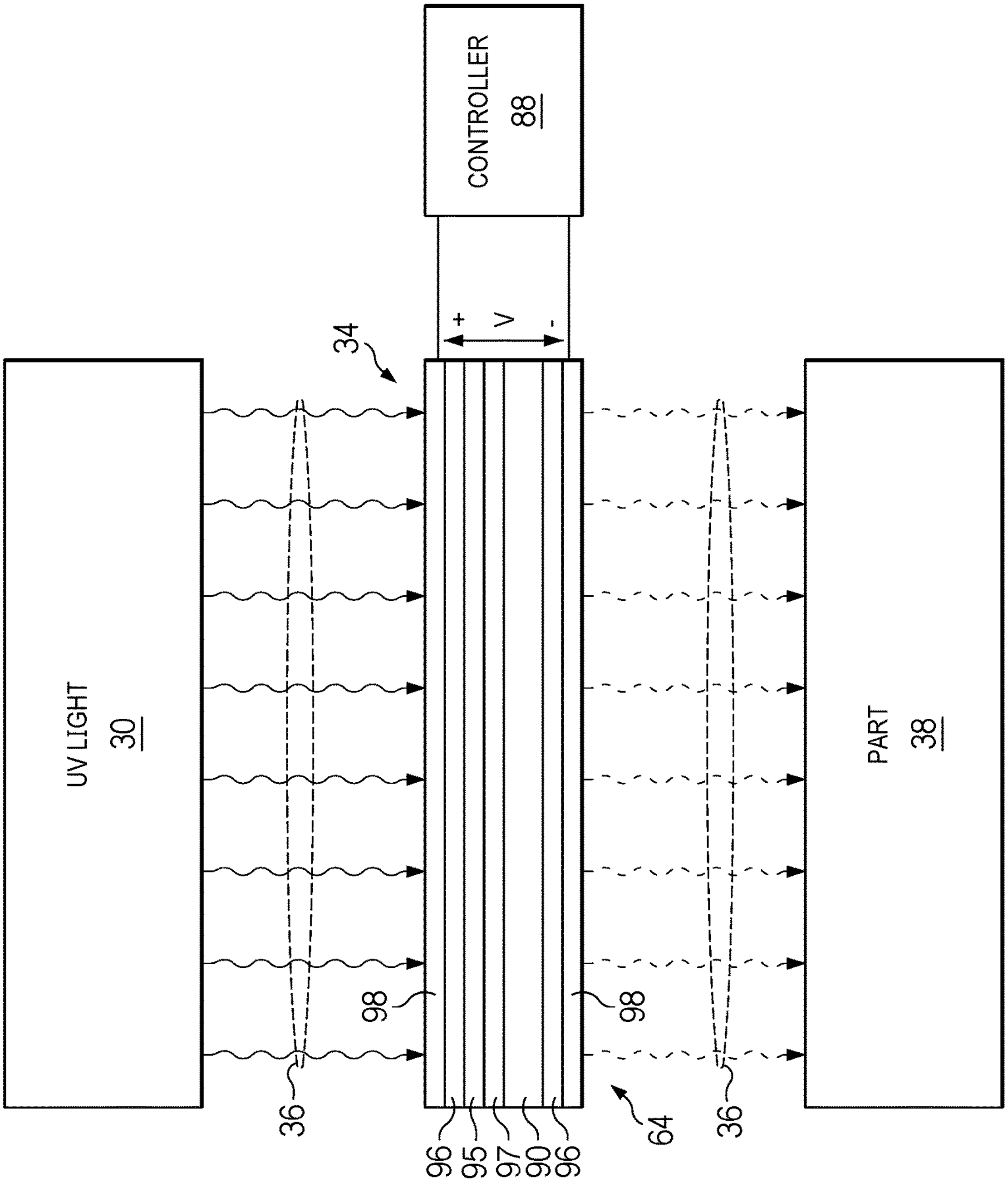
FIG. 15 is an illustration of a combined block and diagrammatic view of apparatus for UV light curing of photopolymer parts employing an electrochromatic filter for selectively blocking UV light emitted from a UV lamp.
Figure 16:
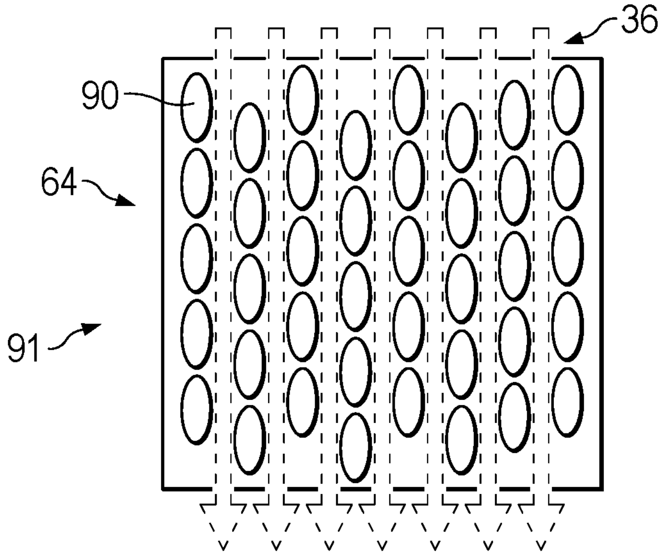
FIG. 16 is an illustration of a diagrammatic view showing the electrochromatic filter in a transparent state allowing UV light to pass therethrough.
Figure 17:
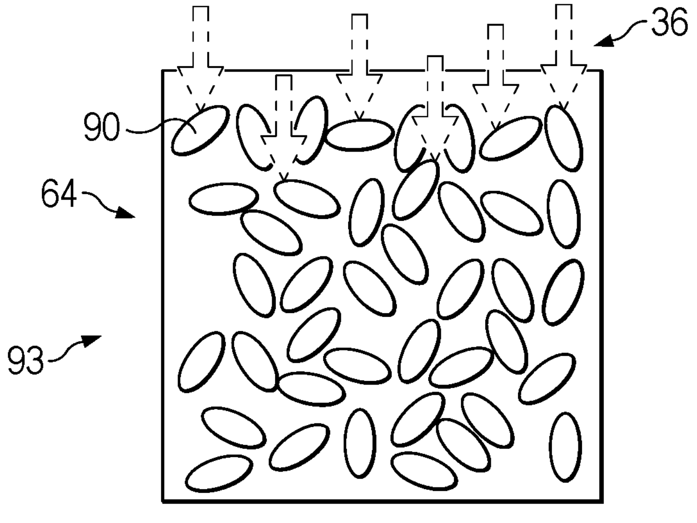
FIG. 17 is an illustration similar to FIG. 16 but showing the electrochromatic filter in an opaque state blocking passage of UV light.

Attention is now directed to FIGS. 15-17 which illustrate another embodiment of a filter 64, which is electrically controlled and does not require mechanical movements, yet is capable of blocking UV light 36 from reaching the part (38). As used herein, "blocking" means that the filter is capable of preventing UV light (36) from reaching the part (38) at an intensity level that would cause the part (38) to cure. In this example, the filter 64 is an electrochromatic switchable filter, however other similar, electronically controlled, non-mechanical UV light filters are possible. Electrochromic materials affect the opacity of a surface when a voltage is applied to them, allowing the surface to be switched between a transparent state 91 and an opaque state 93, and thereby control the passage of light therethrough within a range of frequencies that is determined by the type of electrochromic material being used. In the illustrated example, filter 64 comprises a multilayer sandwich comprising a layer of electrochromatic material 90 such as tungsten oxide, an ion storage layer 95, an ion conductor layer 97, all of which are sandwiched between a pair of electrodes 96, and two glass outer layers 98. Referring concurrently to FIGS. of 15-17, a voltage V applied to the electrodes 94 switches the electrochromatic filter 64 from a clear state 91 (FIG. 16) allowing UV light 36 to pass from the UV lamp 30 through the filter 64 to the part 38, to an opaque state 93 (FIG. 17) in which the UV light 36 is blocked from passing through the filter 64.

Figure 18:
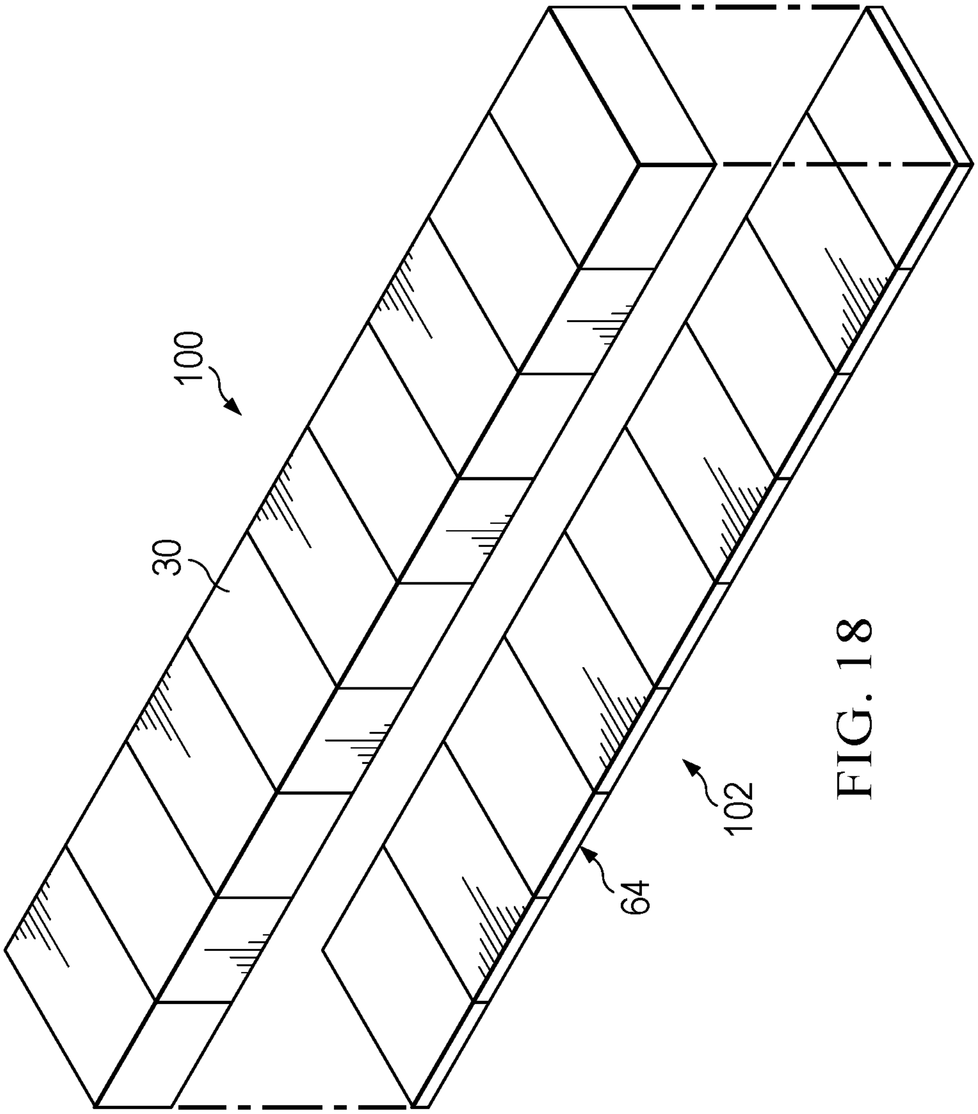
FIG. 18 is illustration of a perspective view showing how a linear array of the electrochromatic filters can be mounted face-to-face on a linear array of UV lamps.

Referring also now to FIG. 18, electronically controlled filters 64 of the type described above can be arranged as a single unit or multiple units and the placed in face-to-face contact with an array 100 of the UV LEDS 32. In FIG. 18, both the UV LEDS 32 and the electrochromatic filters 64 are arranged as a linear array, however the array may also be a two dimensional N×M array that is aligned with a similar N×M array of UV LEDs 32.

Figure 19:
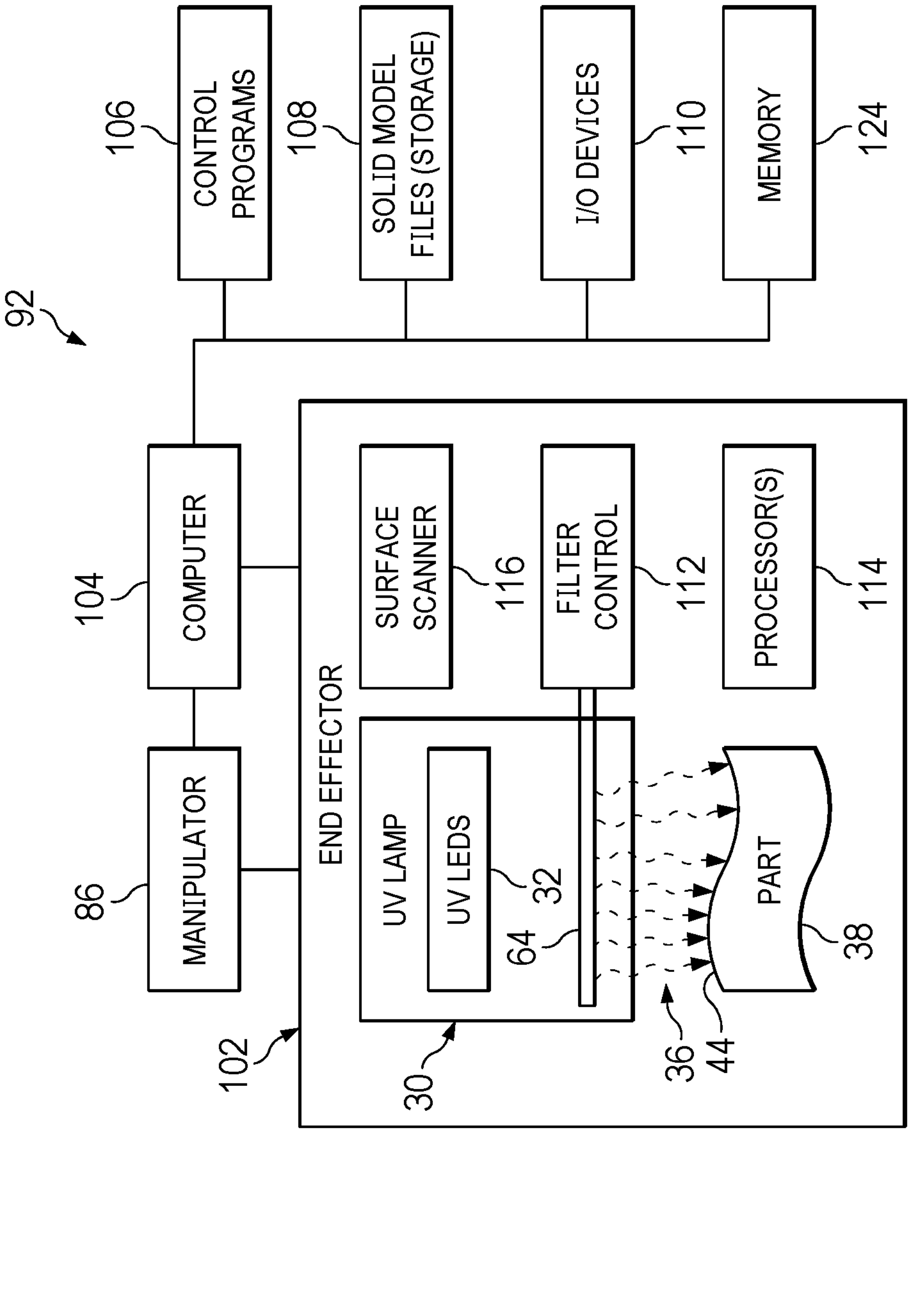
FIG. 19 is an illustration of a functional block diagram of apparatus for automated UV light curing of photopolymer parts.
Figure 20:
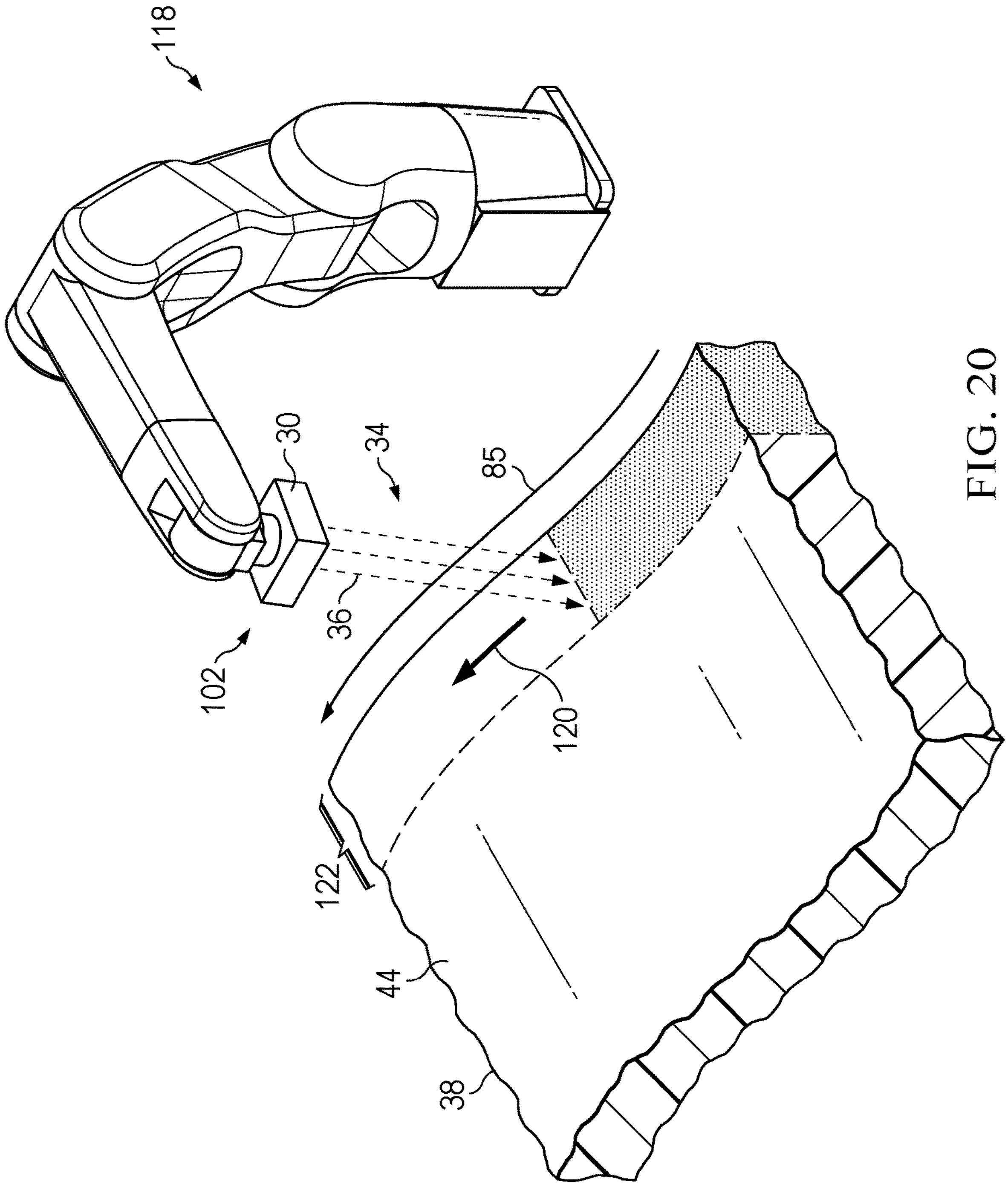
FIG. 20 is an illustration of a perspective view of a UV lamp mounted on a manipulator in the process of curing a section of a photopolymer resin part.

FIGS. 19 and 20 illustrate the overall components of one embodiment of an apparatus 92 for curing photopolymer resin parts 38 having an irregular surface 44. The apparatus 92 includes an end effector 102 mounted on a manipulator 86 such as the multi-axis, articulated arm robot 118 shown in FIG. 20. The UV lamp 30 is mounted on the end effector 102 which moves the UV lamp 30 over the irregular surface 44 of a part 38, causing the UV lamp 30 to scan 120 and thereby irradiate 34 the irregular surface 44 with UV light 36. As the UV lamp 30 moves over the part 38, the robot 118 maintains a constant distance between the UV lamp 30 and the irregular surface 44 of the part 38, making adjustments in the position of the UV lamp 30 as necessary to compensate for irregularities 41. In effect, the robot 118 moves the UV lamp 30 along a path 85 complimentally matching the irregular surface 44 of the part 38. In this example, a swath 122 is shown being scanned however, depending upon the configuration of the UV lamp 30 and size of the irradiation window (FIG. 1), the entire width of the part 38 may be irradiated in a single pass. Use of an automatically controlled manipulator 86 such as the robot 118 allows the position and orientation of the UV lamp 30 to be continuously adjusted during a scan 120 in order to maintain a constant spacing between the UV lamp 30 and the irregular surface 44. Maintaining this spacing constant results in all areas of the irregular surface 44 being irradiated 34 uniformly with UV light at the same level of intensity.

Referring particularly to FIG. 19, the end effector 102 may include an electrically controlled, noncontact surface scanner 116 which functions to scan the irregular surface 44 of the part 38, and generate a digital surface map of the irregular 44, including any irregularities 41, such as surface contours. This digital surface map can then be used to control movement of the end effector 102 and compensate for the irregularities 41 in order to irradiate 34 the part 38 uniformly. Depending upon the configuration of the UV lamp 30, a filter 64 of the type discussed previously may be provided which can be operated by either an onboard filter control 112, or by a computer 104 that controls operation of the manipulator 86, as well as the end effector 102. One or more onboard processors 114 may also be provided to control, or assist the computer 104 in electronically controlling any of the equipment carried on the end effector 102. The apparatus 92 further includes one or more control programs 106 utilized by the computer 104 to control the manipulator 86 and the end effector 102, as well as I/O devices (input/output devices) 110, and memory 124 for storing data related to processing of the part 38. Solid model file storage 108 may be also provided, comprising solid models of one or more of parts 38. The solid models can be used by the manipulator 86 to assist in guiding the end effector 102 in a desired path 85 over the irregular surface 44 of the part 38.

Figure 21A:
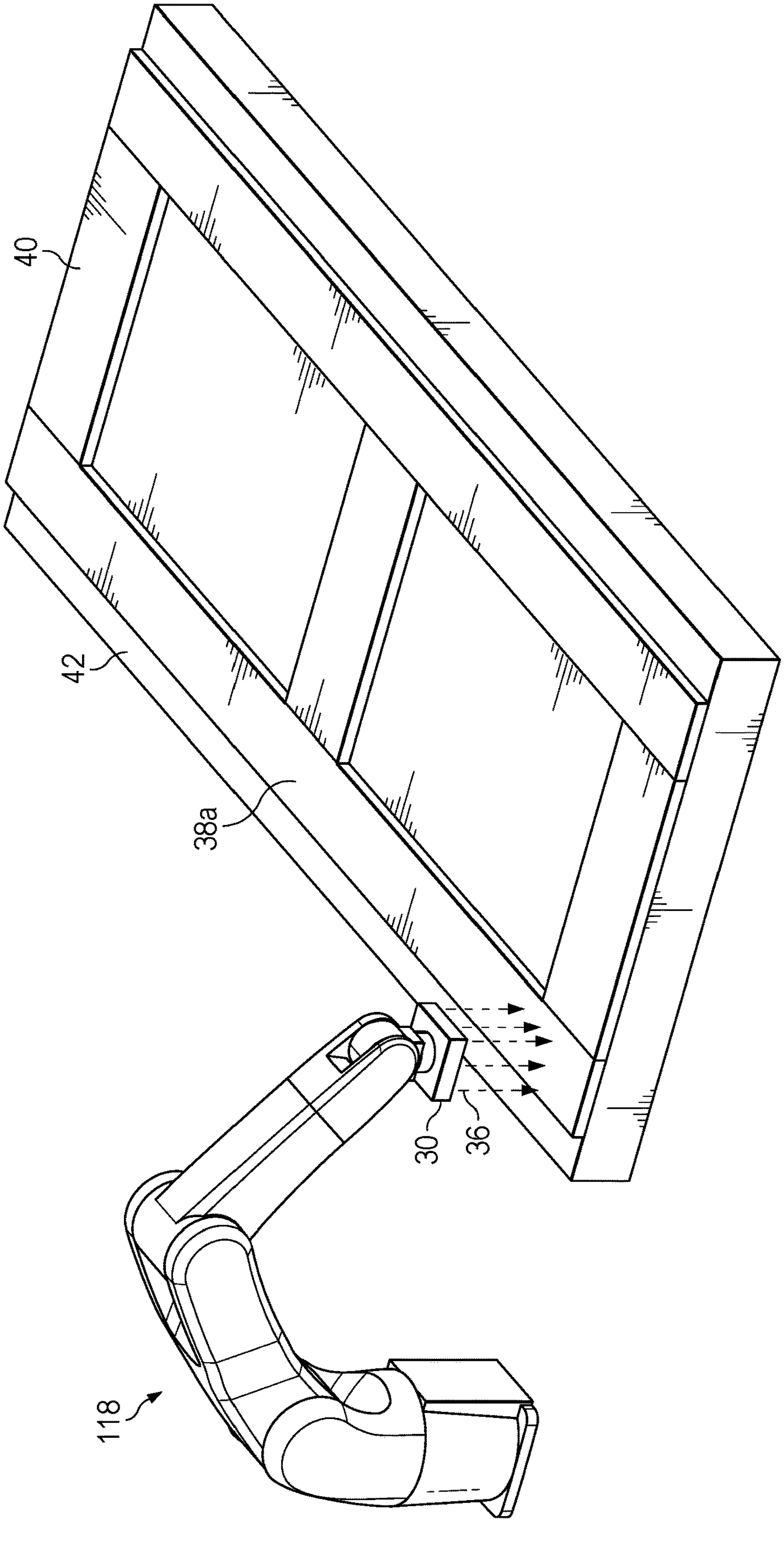
FIGS. 21A-21D are illustrations of perspective views showing how a UV lamp controlled by a manipulator can be employed to cure photopolymer resin parts.
Figure 21B:
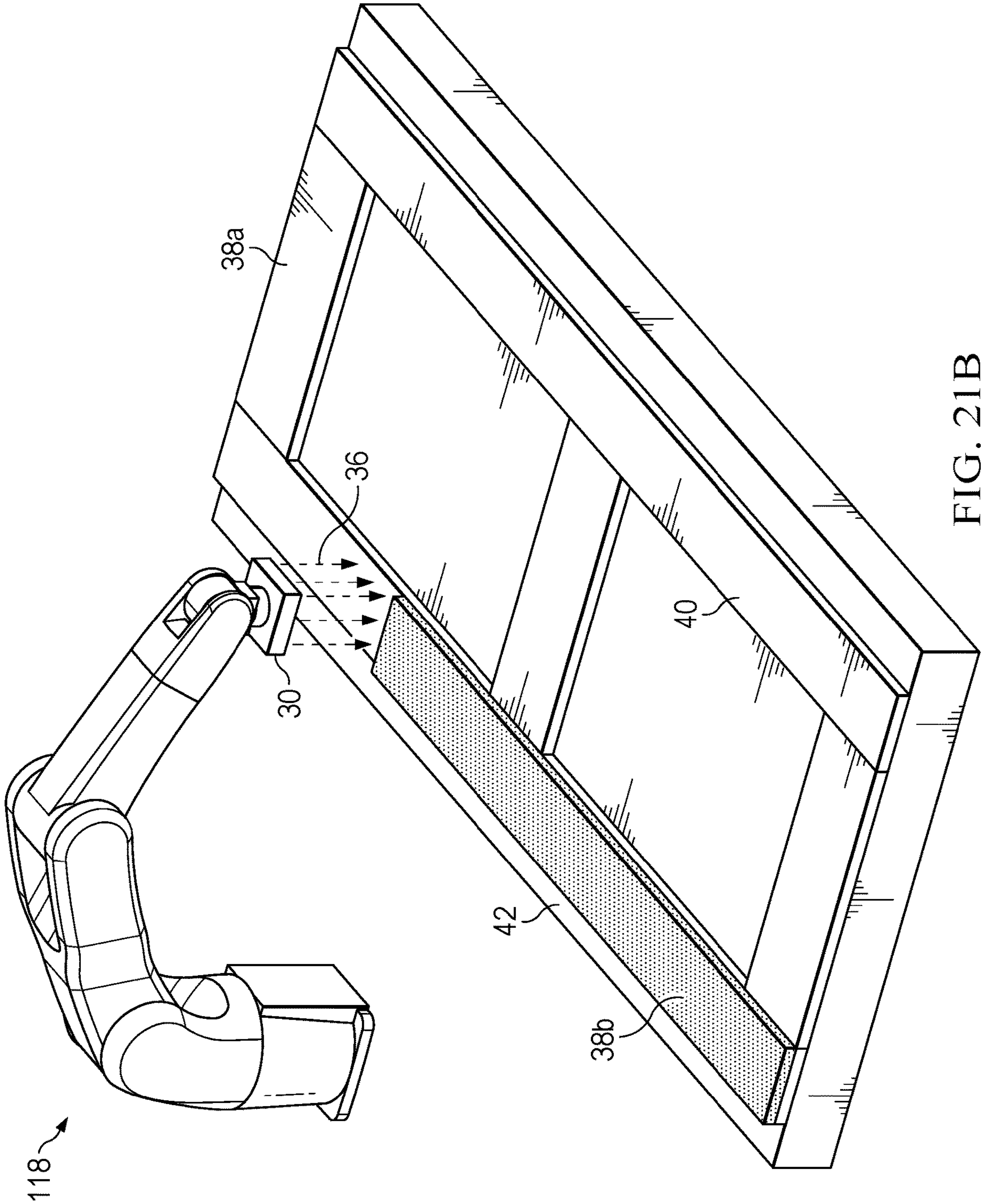
Figure 21C:
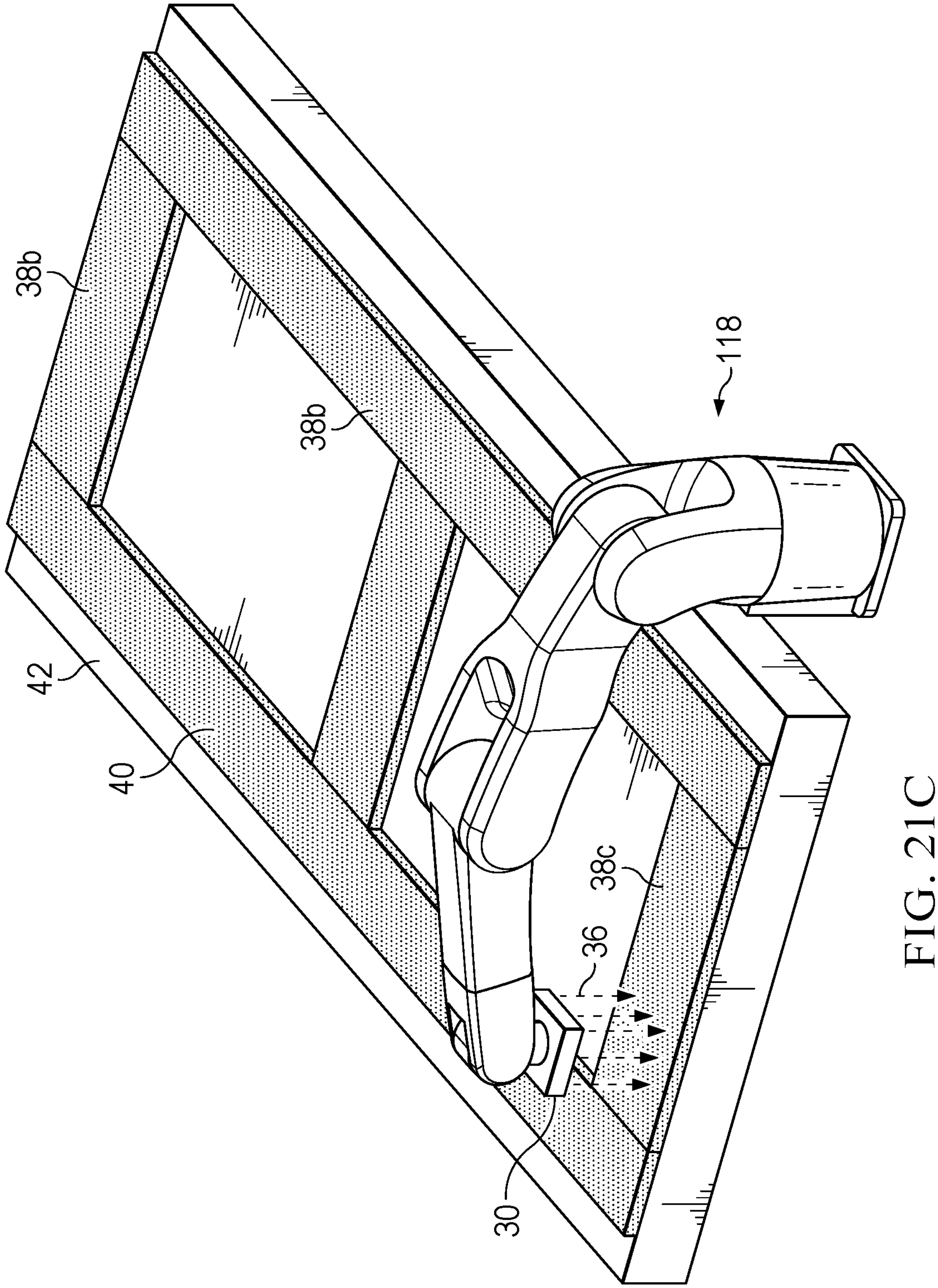
Figure 21D:
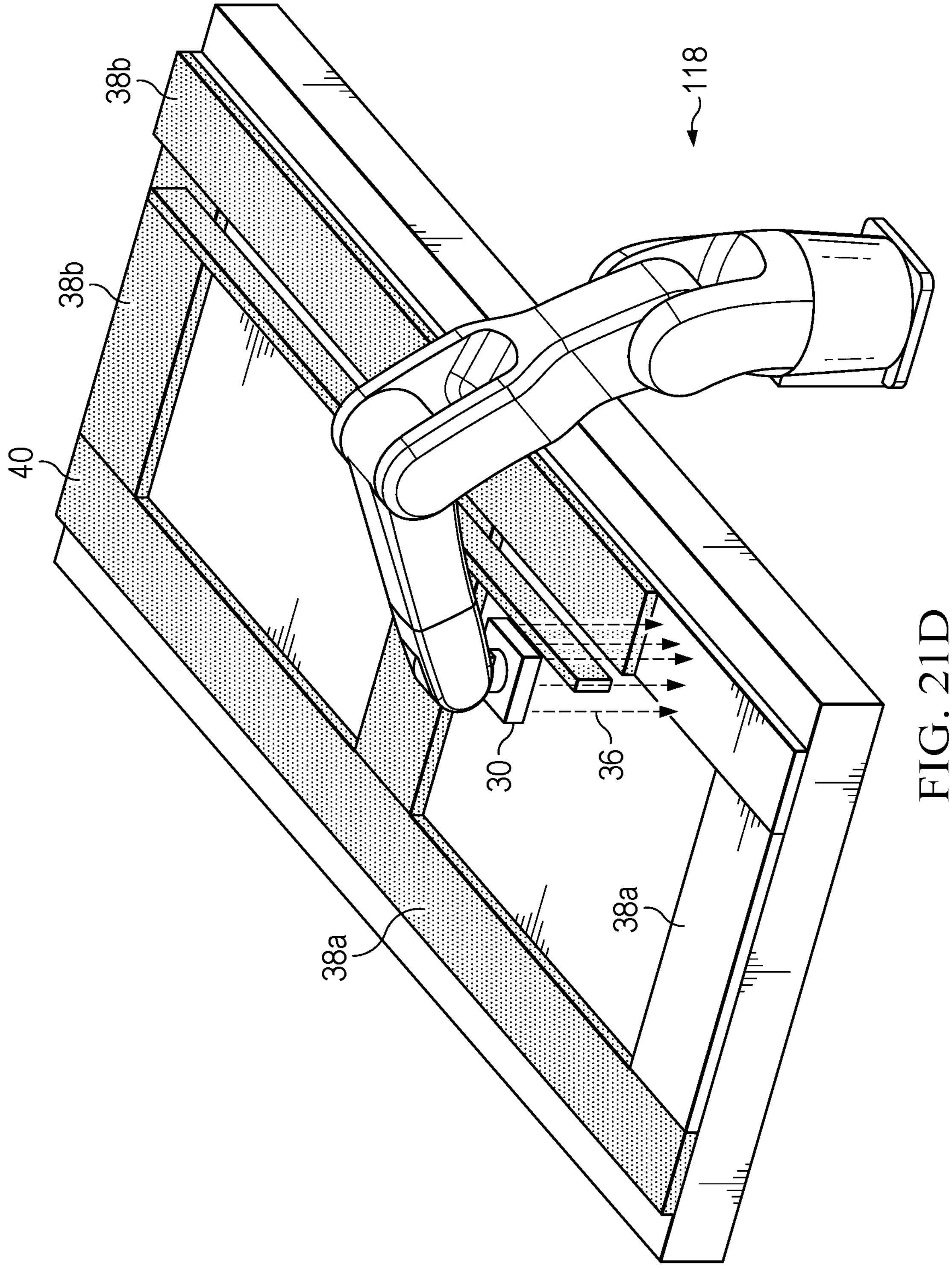

The apparatus described in connection with FIGS. 19 and 20 may be used to automate UV curing of a wide variety of photopolymer resin parts 38 having various geometries. For example, FIG. 21A-21C a illustrate photopolymer resin part 38 that may function as a shim forming part of an aircraft assembly. In this example, the part 38 comprises multiple strips 40 which are shown as having been laid down on a substrate 42. The illustrated substrate 42 is substantially flat, however in other examples it may be curved as shown in FIGS. 2-4, or possess other irregular features or geometries.

Figure 22:
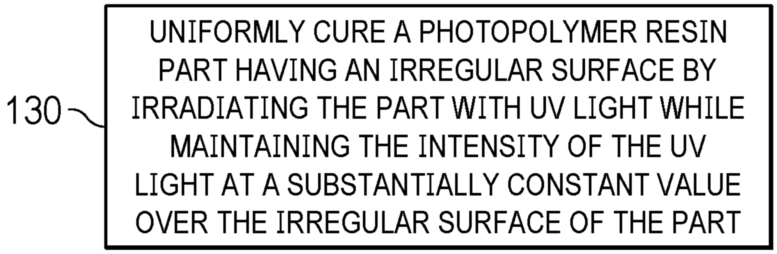
FIG. 22 is a block diagram illustrating a method of evenly curing a photopolymer resin part having irregular surfaces through the uniform application of UV light.

FIG. 22 broadly illustrates a method of curing photopolymer resin parts 38. As shown at 130, the method comprises irradiating the part 38 with UV light 36, including maintaining the intensity of the UV light 36 at a substantially constant value over the irregular surface of the part 38.

Figure 23:
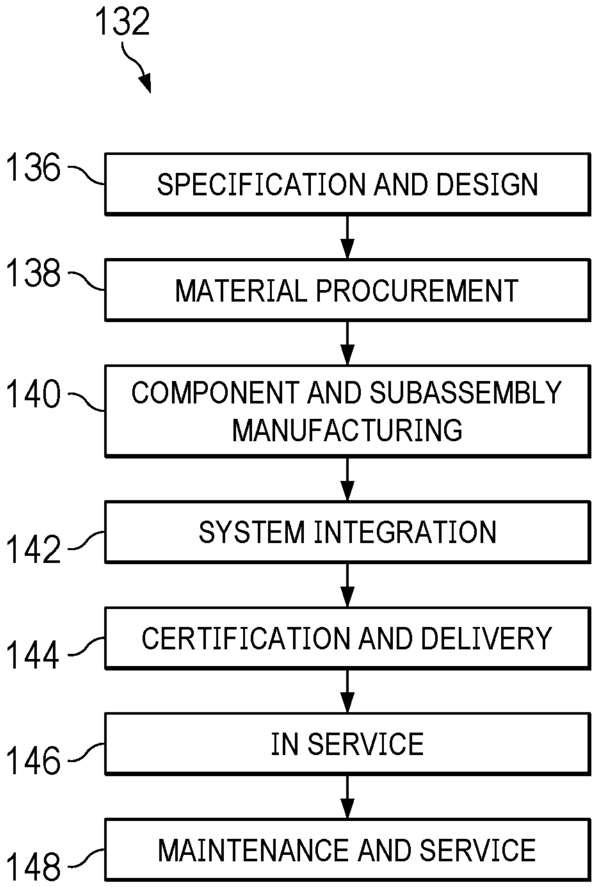
FIG. 23 an illustration of a flow diagram of aircraft production and service methodology.
Figure 24:
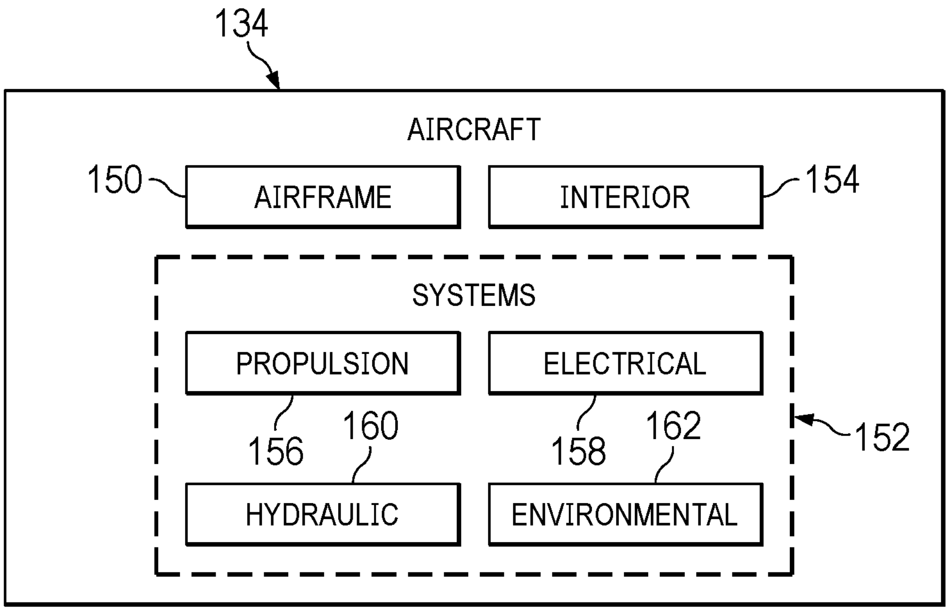
FIG. 24 is an illustration of a block diagram of an aircraft.

Examples of the disclosure may find use in a variety of potential applications, particularly in the transportation industry, including for example, aerospace, marine, automotive applications and other application where photopolymer resin parts and adhesives are used. Thus, referring now to FIGS. 23 and 24, examples of the disclosure may be used in the context of an aircraft manufacturing and service method 132 as shown in FIG. 23 and an aircraft 134 as shown in FIG. 24. Aircraft applications of the disclosed examples may include a variety of parts and adhesives that are formed of UV cured photopolymer resins which may or may not contain reinforcements. During pre-production, the method 132 may include specification and design 136 of the aircraft 134 and material procurement 138. During production, component and subassembly manufacturing 140 and system integration 142 of the aircraft 134 takes place. Thereafter, the aircraft 134 may go through certification and delivery 144 in order to be placed in service 146. While in service by a customer, the aircraft 134 is scheduled for routine maintenance and service 148, which may also include modification, reconfiguration, refurbishment, and so on.

Each of the processes of method 132 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 134 produced by method 132 may include an airframe 150 with a plurality of high-level systems 152 and an interior 154. Examples of high-level systems 152 include one or more of a propulsion system 156, an electrical system 158, a hydraulic system 160 and an environmental system 162. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 132. For example, components or subassemblies corresponding to component and subassembly manufacturing 140 may be fabricated or manufactured in a manner similar to components or subassemblies produced while the aircraft 134 is in service. Also, one or more apparatus examples, method examples, or a combination thereof may be utilized during the component and subassembly manufacturing 140 and system integration 142, for example, by substantially expediting assembly of or reducing the cost of an aircraft 134. Similarly, one or more of apparatus examples, method examples, or a combination thereof may be utilized while the aircraft 134 is in service, for example and without limitation, to maintenance and service 148.

As used herein, the phrase "at least one of", a when used with list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of curing a part formed of a photopolymer resin and having an irregular surface, comprising:

moving a UV lamp having a plurality of UV light sources over the irregular surface;

arranging the plurality of UV light sources in a pattern to irradiate the part with UV light having a uniform intensity;

irradiating the part uniformly throughout the irregular surface using UV light from the plurality of UV light sources;

interposing an electrochromatic filter between at least some of the plurality of the UV light sources and the part, selectively energizing the electrochromatic filter between a clear state allowing the UV light to pass through the electrochromatic filter and an opaque state blocking the UV light from passing though the electrochromatic filter; and adjusting a distance between the UV lamp and the irregular surface based on irregularities in the irregular surface as the UV lamp moves over the irregular surface.

2. The method of claim 1, wherein the pattern has a shape complementary to the irregular surface of the part.

3. The method of claim 1, wherein the arranging includes spacing the UV light sources uniform distances away from the irregular surface of the part.

4. The method of claim 1, wherein the arranging includes spacing the UV light sources different distances away from the irregular surface of the part.

5. The method of claim 1, wherein filtering includes interposing a shutter between the at least some of the UV light sources and the part.

6. The method of claim 1 wherein irradiating the part uniformly includes:

mounting the UV lamp on a manipulator, and moving the UV lamp along a path complementary to the irregular surface of the part.

7. The method of claim 6, wherein moving the UV lamp along the path includes adjusting a distance between the UV lamp and the part such that an intensity of the UV light incident on the irregular surface is substantially constant.

8. The method of claim 1, wherein:

adjusting the distance includes individually adjusting a position of at least some of the plurality of UV light sources based on irregularities in the irregular surface.

9. The method of claim 1, wherein the plurality of UV light sources are mounted on supports capable of shifting linearly to adjust a distance between the plurality of UV light sources and the part.

10. A method of curing a part formed of a photopolymer resin and having an irregular surface, comprising:

arranging a plurality of UV light sources in a pattern configured to irradiate the part with UV light having a uniform intensity;

irradiating the part uniformly throughout the irregular surface using the UV light from the plurality of UV light sources;

filtering out the UV light irradiated by at least some of the UV light sources by interposing an electrochromatic filter between the at least some of the UV light sources and the part; and selectively energizing the electrochromatic filter between a clear state allowing the UV light to pass through the electrochromatic filter and an opaque state blocking the UV light from passing though the electrochromatic filter.

11. The method of claim 10, wherein the pattern has a shape complementary to the irregular surface of the part.

12. The method of claim 10, wherein the arranging includes spacing the plurality of UV light sources uniform distances away from the irregular surface of the part.

13. The method of claim 10, wherein the arranging includes spacing the plurality of UV light sources different distances away from the irregular surface of the part.

14. The method of claim 10, wherein the filtering includes interposing a shutter between the at least some of the UV light sources and the part.

15. The method of claim 10 wherein irradiating the part uniformly includes:

mounting the plurality of UV light sources on a manipulator, and moving the plurality of UV light sources along a path complementary to the irregular surface of the part.

16. The method of claim 15, wherein moving the plurality of UV light sources along the path includes adjusting a distance between the plurality of UV light sources and the part such that an intensity of the UV light incident on the irregular surface is substantially constant.

17. The method of claim 10, wherein irradiating the part includes:

moving the plurality of UV light sources over the irregular surface, and adjusting a distance between the plurality of UV light sources and the irregular surface based on irregularities in the irregular surface.

18. The method of claim 17 wherein:

adjusting the distance includes individually adjusting a position of at least some of the plurality of UV light sources based on a distance between the plurality of UV light sources and the irregular surface.

19. The method of claim 10, wherein the plurality of UV light sources are mounted on supports capable of shifting linearly to adjust a distance between the plurality of UV light sources and the part.

20. The method of claim 9, a linear position of the UV light sources may be adjusted manually or automatically using air or pneumatic cylinders.

* * * * *